(12) United States Patent
Lin et al.

(10) Patent No.: US 12,032,914 B2
(45) Date of Patent: Jul. 9, 2024

(54) DATA PROCESSING METHOD, APPARATUS, ELECTRONIC DEVICE, AND COMPUTER STORAGE MEDIUM

(71) Applicant: Alibaba (China) Co., Ltd., Hangzhou (CN)

(72) Inventors: Xuming Lin, Hangzhou (CN); Zhongzhou Zhao, Hangzhou (CN); Shuiling He, Hangzhou (CN); Liming Pu, Hangzhou (CN); Ji Zhang, Hangzhou (CN)

(73) Assignee: Alibaba (China) Co., Ltd., Zheji (CN)

( * ) Notice: Subject to any disclaimer, the term of this patent is extended or adjusted under 35 U.S.C. 154(b) by 317 days.

(21) Appl. No.: 17/701,455

(22) Filed: Mar. 22, 2022

(65) Prior Publication Data
US 2022/0309249 A1 Sep. 29, 2022

(30) Foreign Application Priority Data
Mar. 29, 2021 (CN) .......................... 202110336398.6

(51) Int. Cl.
*G06F 40/30* (2020.01)
*G06F 40/40* (2020.01)
*G06V 30/14* (2022.01)
*G10L 15/26* (2006.01)

(52) U.S. Cl.
CPC .............. *G06F 40/30* (2020.01); *G06F 40/40* (2020.01); *G06V 30/1448* (2022.01); *G10L 15/26* (2013.01)

(58) Field of Classification Search
USPC ...................................... 704/1–504
See application file for complete search history.

(56) References Cited

U.S. PATENT DOCUMENTS

| 10,990,367 B2 * | 4/2021 | Gong ......................... G06F 8/53 |
| 11,080,336 B2 * | 8/2021 | Van Dusen ............. G06Q 10/10 |
| 2004/0158455 A1 * | 8/2004 | Spivack .................. G06N 5/048 |
| | | 707/E17.058 |
| 2004/0220893 A1 * | 11/2004 | Spivack .................. G06F 16/30 |
| | | 706/50 |

(Continued)

FOREIGN PATENT DOCUMENTS

WO WO-2018176017 A1 * 9/2018 ......... G06F 18/2178

*Primary Examiner* — Marcus T Riley
(74) *Attorney, Agent, or Firm* — Lee & Hayes, P.C.

(57) ABSTRACT

Data processing method, apparatus, electronic device, and computer storage medium are provided. The data processing method is used to generate a description information file related to a target object, and includes: obtaining a description framework and multiple types of multiple materials related to the target object, the description framework including attribute selection information corresponding to the target object; performing at least one type of processing on each material to obtain attribute information of the respective material, and the attribute information including an attribute level and an attribute content; selecting target materials whose attribute content and attribute level match the attribute selection information of the description framework; and generating a description information file according to the description framework and the target materials. The data processing method may automatically generate description information files.

20 Claims, 8 Drawing Sheets

(56) References Cited

U.S. PATENT DOCUMENTS

| | | | |
|---|---|---|---|
| 2013/0212502 A1* | 8/2013 | Ahn | G06F 3/0481 |
| | | | 715/764 |
| 2019/0310835 A1* | 10/2019 | Gong | G06F 8/41 |
| 2019/0369938 A1* | 12/2019 | Jiang | G06F 3/0486 |
| 2020/0327378 A1* | 10/2020 | Smith | G06V 20/40 |
| 2022/0292423 A1* | 9/2022 | Ash | G06Q 30/01 |
| 2022/0309249 A1* | 9/2022 | Lin | G06V 30/416 |

* cited by examiner

DATA PROCESSING METHOD, APPARATUS, ELECTRONIC DEVICE, AND COMPUTER STORAGE MEDIUM

CROSS REFERENCE TO RELATED PATENT APPLICATIONS

This application claims priority to Chinese Patent Application No. 202110336398.6, filed on 29 Mar. 2021 and entitled "Data Processing Method, Apparatus, Electronic Device, and Computer Storage Medium," which is hereby incorporated by reference in its entirety.

TECHNICAL FIELD

Embodiments of the present disclosure relate to the field of computer technology, and in particular, to data processing methods, apparatuses, electronic devices, and computer storage media.

BACKGROUND

With the development of artificial intelligence technology, applications of artificial intelligence have become increasingly popular, such as generating description information files for a target object to explain attributes and features, etc., of the target object. However, since types and numbers of target objects are enormous, and features thereof are different, most of the work is still manually performed with artificial intelligence providing assistance when generating a description information file. This makes it difficult, labor intensive and costly to generate corresponding description information files for a large number of target objects.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer readable instructions as permitted by the context above and throughout the present disclosure.

In view of this, embodiments of the present disclosure provide data processing solutions to at least partially solve the above-mentioned problems.

According to embodiments of the present disclosure, a data processing method is provided for generating a description information file related to a target object, which includes: obtaining a description framework and multiple types of multiple materials related to the target object, the description framework including attribute selection information corresponding to the target object; performing at least one type of processing on each material to obtain attribute information of the respective material, and the attribute information including an attribute level and an attribute content; selecting target materials whose attribute content and attribute level match the attribute selection information of the description framework; and generating a description information file according to the description framework and the target materials.

According to embodiments of the present disclosure, a data processing method is provided for generating a description information file related to a target object, which includes: displaying multiple types of materials corresponding to the target object, processing options corresponding to the materials and description framework editing options in a display interface; receiving a trigger operation for a processing option corresponding to at least one material in the display interface, processing the material to obtain attribute information of the material, and displaying the attribute information, the attribute information including an attribute level and an attribute content; receiving an editing operation on the description framework editing options, and obtaining the description framework according to an editing result, the description framework including attribute selection information corresponding to the target object; selecting target materials whose attribute content and attribute level match the attribute selection information of the description framework from the materials; and generating a description information file according to the description framework and the target materials.

According to embodiments of the present disclosure, a data processing apparatus for generating a description information file related to a target object is provided, which includes: a first acquisition module configured to obtain a description framework and multiple types of multiple materials related to the target object, the description framework including attribute selection information corresponding to the target object; a first processing module configured to perform at least one type of processing on each material to obtain attribute information of the respective material, and the attribute information including an attribute level and an attribute content; a first matching module configured to select target materials whose attribute content and attribute level match the attribute selection information of the description framework; and a first generating module configured to generate a description information file according to the description framework and the target materials.

According to embodiments of the present disclosure, a data processing apparatus for generating a description information file related to a target object is provided, which includes: a display module configured to display multiple types of materials corresponding to the target object, processing options corresponding to the materials and description framework editing options in a display interface; a second processing module configured to receive a trigger operation for a processing option corresponding to at least one material in the display interface, process the material to obtain attribute information of the material, and display the attribute information, the attribute information including an attribute level and an attribute content; a receiving module configured to receive an editing operation on the description framework editing option, and obtain the description framework according to an editing result, the description framework including attribute selection information corresponding to the target object; a second matching module configured to select target materials whose attribute content and attribute level match the attribute selection information of the description framework from the materials; and a second generating module configured to generate a description information file according to the description framework and the target materials.

According to embodiments of the present disclosure, an electronic device is provided, which includes: a processor, a memory, a communication interface, and a communication bus. The processor, the memory, and the communication interface conduct inter-communications with each other through the communication bus. The memory is configured to store at least one executable instruction that causes the processor to perform operations corresponding to the data processing method described in the first aspect or the second aspect.

According to embodiments of the present disclosure, a computer storage medium having a computer program stored thereon is provided. The program, when executed by a processor, implements the data processing method as described in the first aspect or the second aspect.

According to the data processing solutions provided by embodiments of the present disclosure, a description framework is used to define a frame of a description information file, which may be decoupled from materials, so that a description information file of a target object is not limited to different materials, and attribute information is determined by processing the materials. As such, matching target materials are obtained according to the description framework. The target materials are combined according to the description framework to form a description information file. In this way, since the description framework hierarchizes a script according to the attributes, the description framework is decoupled from the materials, thereby improving the adaptability. Corresponding description information files are generated for different target objects, and the description information files may include features of different target objects, thus ensuring the qualities of the description information files.

BRIEF DESCRIPTION OF THE DRAWINGS

In order to more clearly describe the technical solutions in embodiments of the present disclosure or existing technologies, the drawings that need to be used for describing embodiments or the existing technologies will be briefly introduced as follows. Apparently, the drawings in the following description represent only some embodiments described in embodiments of the present disclosure. For one of ordinary skill in the art, other drawings may also be obtained based on these drawings.

DETAILED DESCRIPTION

In order to enable one skilled in the art to better understand the technical solutions in embodiments of the present disclosure, the technical solutions in embodiments of the present disclosure will be described clearly and completely in conjunction with the accompanying drawings in embodiments of the present disclosure. Apparently, the described embodiments represent only some and not all of embodiments of the present disclosure. Based on embodiments in embodiments of the present disclosure, all other embodiments obtained by one of ordinary skill in the art should fall within the scope of protection of embodiments of the present disclosure.

Specific implementations of embodiments of the present disclosure will be further described below in conjunction with the accompanying drawings of embodiments of the present disclosure.

Figure 1A:
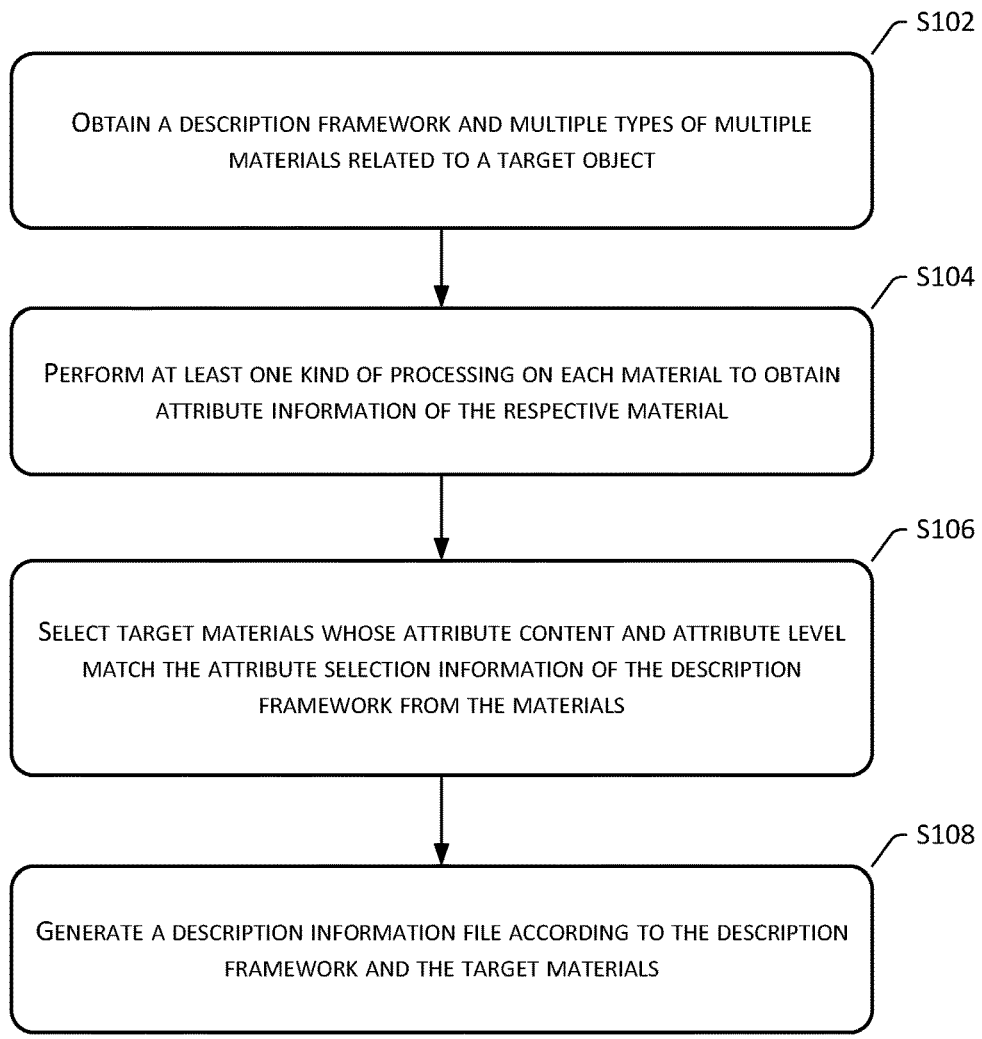
FIG. 1A is a flowchart of a data processing method according to embodiments of the present disclosure.

Referring to FIG. 1A, a schematic flowchart of a data processing method 100 in embodiments of the present disclosure is shown.

In embodiments, the method 100 includes the following steps:

Step S202: Obtain a description framework and multiple types of multiple materials related to a target object, the description framework including attribute selection information corresponding to the target object.

The target object may be a commodity, a building, etc. The commodity may be a physical commodity or a virtual commodity. In embodiments, description is made by applying the method, as an example, to generate a script for use in virtual live broadcast generation in virtual live broadcast scenario in which virtual object is used as an anchor. Apparently, in other embodiments, the method may also be applied to any other appropriate scenarios, which are not limited herein.

A description framework is used to divide a description information file corresponding to a target object into levels according to attributes, such that different content segments in the description information file thus generated may be used to describe different attributes of the target object. In this way, target objects of the same class may adopt the same or similar description framework, so that description framework can be decoupled from material(s) of a target object, thereby improving adaptability, reducing costs, and achieving automatic generation of description information files.

Different description frameworks may be configured for different target objects. In embodiments, the description framework includes attribute selection information corresponding to the target object. The attribute selection information of the description framework is used to indicate an order of titles, selected target attributes corresponding to the titles, and attribute values corresponding to the selected target attributes.

The order of titles includes, for example, product name, highlight and feature, etc. Each title corresponds to at least one candidate attribute, and each candidate attribute has at least one attribute value. The attribute selection information is also used to indicate target attribute(s) selected from the candidate attributes corresponding to the title, and attribute value(s) selected for the target attribute(s).

The following table shows a description framework of a wine product.

| Title | Product Name | Highlight | | Feature | | | Net Content |
|---|---|---|---|---|---|---|---|
| Cohesive Sentence | No | No | No | Yes | No | No | No |

-continued

| Title | Product Name | Highlight | | Feature | | | Net Content |
|---|---|---|---|---|---|---|---|
| Attribute Value List | Yes | Yes | Yes | Yes | Yes | Yes | Yes |
| Attribute Description | Yes | Yes | Yes | Yes | Yes | Yes | Yes |
| Attribute Selection | Any | All | All | Any | Any | Any | Any |
| Attribute Value Selection | All | Any | Any | All | All | All | All |
| Attribute | Classification/ Special Product Classification | Other Elements | Wine Flavor Type | Packaging Method | Ingredients/ Raw Ingredients | Taste | Net Content |

The first line in the table describes an order of titles involved in the framework, such as product name, highlight, feature, and net content, etc. Each title may be divided into multiple subtitles, and one subtitle may correspond to one or more attributes. For example, the product name is split into two sub-titles, which correspond to a classification attribute and a special product classification attribute respectively. The highlight may be divided into two sub-titles, which correspond to other element attribute and wine flavor type attribute respectively. The feature is divided into three sub-titles, two of which correspond to one attribute, namely packaging method and taste respectively, and the other sub-title corresponds to two attributes, namely ingredients and raw ingredients. The attributes corresponding to these titles are candidate attributes.

The attribute description and the attribute selection in the description framework are used to indicate target attributes selected in corresponding titles. For example, if a value corresponding to the attribute description is "yes" and a value corresponding to the attribute selection is "any", this means that these candidate attributes corresponding to associated titles are selected as target attributes.

The attribute value selection and the attribute value list in the description framework are used to indicate selected attribute values corresponding to an attribute. For example, if a value in the attribute value list is "yes", and a value in the attribute value selection is "all", this means that all attribute values corresponding to an associated target attribute are selected.

The content of the description information file may be controlled through the description framework, which not only ensures that the content of the description information file is sufficient and meets the needs, but is not excessively redundant.

Materials may be picture-type materials and/or text-type materials obtained in an appropriate manner. The text-type material includes at least one of text obtained by performing voice recognition on an audio-type material, and an original text.

For a target object in commodity category, an material may be obtained from a detail page, a display picture, a title picture, etc., and a text-type material may be obtained from an explanatory text.

An audio-type material may be audio extracted from a video, or a pure audio without any pictures.

Step S104: Perform at least one kind of processing on each material to obtain attribute information of the respective material, the attribute information including an attribute level and an attribute content.

In embodiments, graphic recognition is performed on an material of the picture type to obtain an attribute sentence corresponding to the material of the picture type. The graphic recognition may use a neural network model having an image recognition function, an OCR (Optical Character Recognition) and other methods to recognize object(s), text(s), etc., and convert the object(s) and the text(s) into corresponding attribute sentence(s), which may be followed by determining attribute information according to the semantics of the attribute sentence(s).

In another feasible method, for a text-type material, attribute mining may be performed on the text-type material to obtain attribute sentence(s) corresponding to the text-type material. For example, attribute mining is performed thereon through a natural language processing model that may perform semantic recognition, etc., thereby obtaining corresponding attribute sentence(s), to enable a determination of attribute information according to the semantics of such candidate attribute sentence(s).

In embodiments, an attribute level of the material is used to indicate a title corresponding to the material, and an attribute content of the material is used to indicate an attribute and an attribute value of a target object described by the material. For example, the attribute content may be "flavor—strawberry flavor", etc.

Step S106: Select target materials whose attribute content and attribute level match the attribute selection information of the description framework from the materials.

In embodiments, according to an attribute level and an order of titles indicated in the attribute selection information, material(s) matching the attribute level is/are determined. Material(s) matching the attribute content is/are then selected from the material(s) matching the attribute level according to selected attributes and attribute values indicated in the attribute selection information.

For example, the attribute selection information indicates that some attributes under the title of product name are selected for description. Attributes corresponding to this title are "category" and "special product category", and thus attribute "category" may be selected as target attribute. All corresponding attribute values under attribute "category" may be selected.

Correspondingly, according to attribute levels of materials, material(s) corresponding to the title is/are selected, and an material for describing attribute values in the attribute "category" is selected from the material(s) as a target material.

Step S108: Generate a description information file according to the description framework and the target materials.

In embodiments, the target materials may be combined according to the order of titles in the description framework to generate the description information file.

Through this method, the problems of possible semantic duplication and redundancy in the materials may be resolved, and the order and content of sentences in the description information file may be controlled according to the description framework. As such, the sentences describing the information file are concise and clear without redundancy. Moreover, the description framework is decoupled from the materials of the target object, so that the description framework may be applied to target objects of one or more categories, thus realizing automatic generation of a corresponding description information file for a target object. Furthermore, when a feature of the target object is changed, the description information file may also be updated quickly, leading to a good adaptability.

Figure 1B:
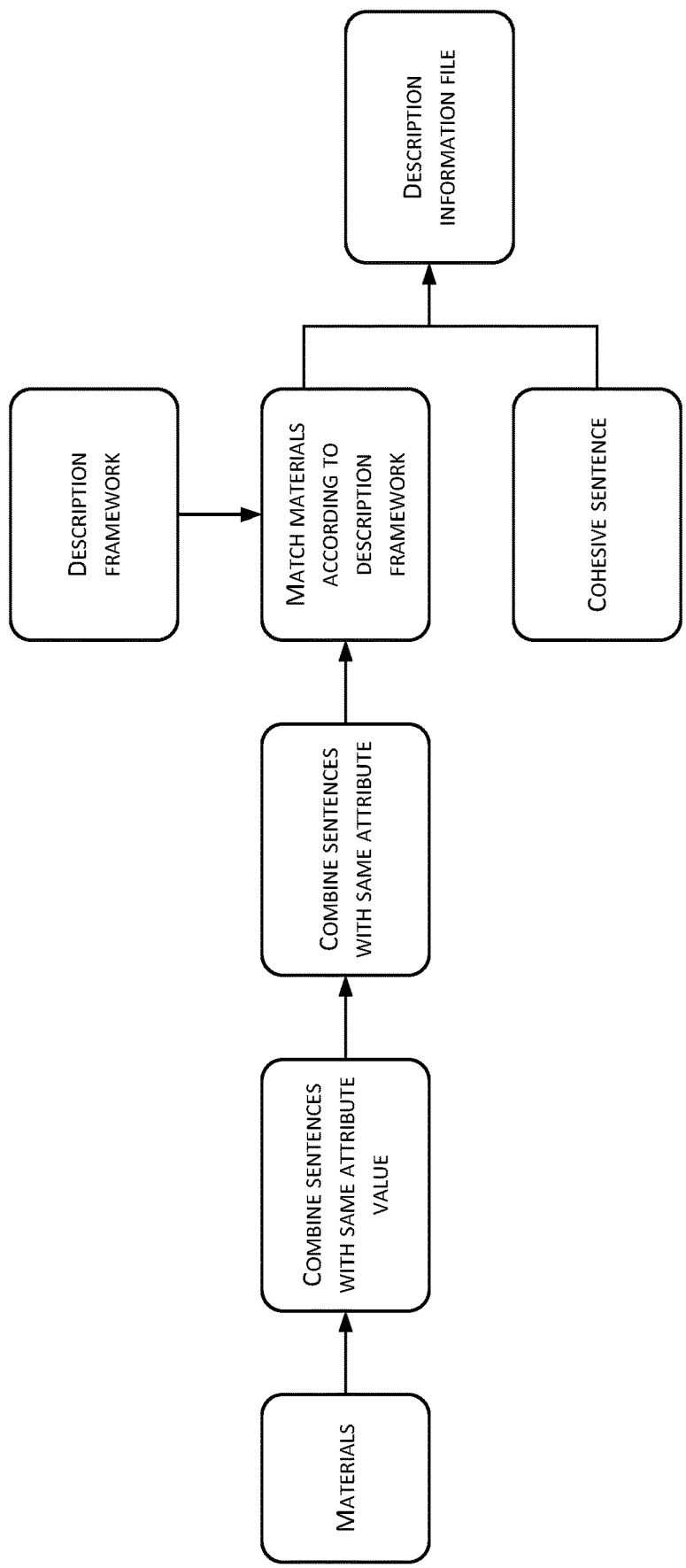
FIG. 1B is a schematic diagram of an example scenario in embodiments as shown in FIG. 1A.

Referring to FIG. 1B, a schematic diagram of a description framework in an application scenario of embodiments of the present disclosure is shown. Materials may be obtained through content mining of comments, a detail page, and a main picture of a target object. There is no restriction on the method of obtaining thereof in this usage scenario.

Attribute information may be obtained by processing the obtained materials. For example, the attribute information includes an attribute level and an attribute content, and the attribute level is, for example, "title", "feature", etc. The attribute content is, for example, "category—wine product", "taste—strawberry flavor", etc.

Based on the attribute selection information corresponding to the description framework, corresponding materials are selected from the materials, and the selected materials are combined according to an order of titles indicated by the description framework, thereby obtaining a description information file.

In combination with the description framework as described above, an example of a description information file corresponding to a wine product is given below. According to the description framework, an attribute selected in the title "feature" is determined as "taste", and all attribute values corresponding to this attribute are selected as attribute values. Based thereon, all attribute values of attribute contents corresponding to taste are selected from materials whose attribute level is "feature". In a similar way, corresponding materials for other entities may be matched.

Based on the order of titles indicated by the attribute selection information, materials corresponding to each title are combined to form a description information file.

Through this embodiment, a description framework is used to define a framework of a description information file, which may be decoupled from materials, so that a description information file of a target object is not limited to different materials, and attribute information is determined by processing the materials. As such, matching target materials are obtained according to the description framework. The target materials are combined according to the description framework to form a description information file. In this way, since the description framework hierarchizes a script according to the attributes, the description framework is decoupled from the materials, thereby improving the adaptability. Corresponding description information files are generated for different target objects, and the description information files may include features of different target objects, thus ensuring the qualities of the description information files.

The data processing method in embodiments may be executed by any appropriate electronic device with data processing capabilities, which includes, but is not limited to, a server, a mobile terminal (such as a mobile phone, a PAD, etc.), and a PC, etc.

Figure 2A:
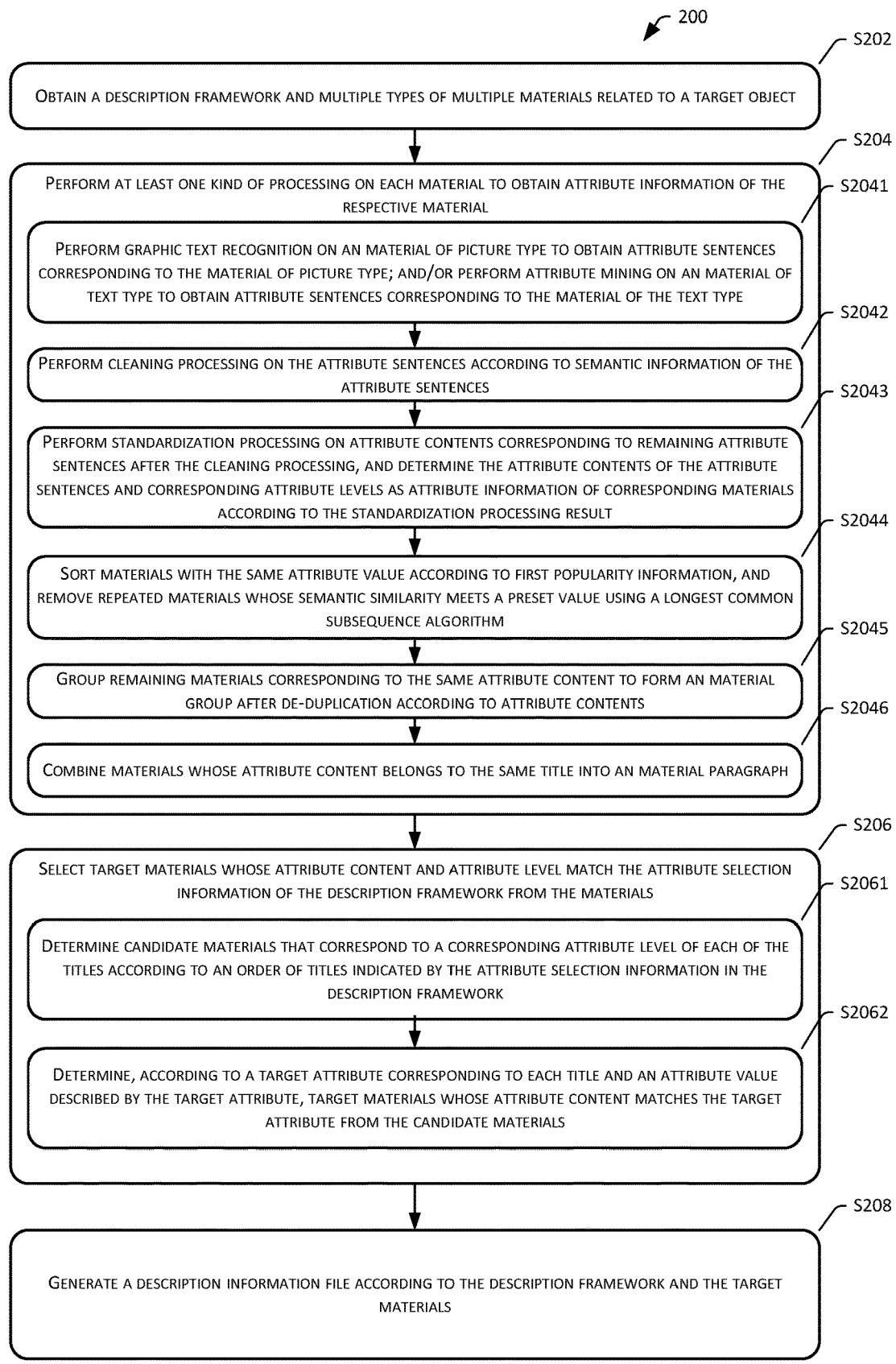
FIG. 2A is a flowchart of a data processing method according to embodiments of the present disclosure.

Referring to FIG. 2A, a schematic flowchart of a data processing method 200 of embodiments of the present disclosure is shown.

In embodiments, the data processing method 200 includes:

Step S202: Obtain a description framework and multiple types of multiple materials related to a target object.

The description framework includes attribute selection information corresponding to the target object. The description framework may be automatically generated according to the target object, or may be adjusted manually as needed. According to different target objects, corresponding values of attributes or attribute selections are adjusted adaptively, so as to obtain a description framework that matches a target object better.

The attribute selection information of the description framework is used to indicate an order of titles, selected target attributes correspond to the titles, and selected attribute values correspond to the target attributes.

Materials of the target object may be obtained in any appropriate way, which is not repeatedly described herein.

Step S204: Perform at least one kind of processing on each material to obtain attribute information of the materials.

Types of materials may be different. Appropriate means may be used to process different types of materials, and corresponding attribute sentences may be obtained to obtain attribute information according to the attribute sentences.

In embodiments, step S204 includes the following sub-steps:

Sub-step S2041: Perform graphic text recognition on an material of picture type to obtain attribute sentences corresponding to the material of picture type; and/or perform attribute mining on an material of text type to obtain attribute sentences corresponding to the material of the text type.

Graphic text recognition, such as object detection, optical character recognition, etc., is performed on materials of picture-type to obtain texts and objects in the materials of picture-type, and corresponding attribute sentences are determined according to the texts and the objects.

Attribute mining, for example, natural language processing, is performed on textual materials to obtain attribute sentences describing attributes of the target object.

Sub-step S2042: Perform cleaning processing on the attribute sentences according to semantic information of the attribute sentences.

In order to reduce the time cost and computing power requirements of subsequent matching, improve matching efficiency, and make the generated description information file to be semantically clear and concise, cleaning processing on the attribute sentences is performed to remove semantically repetitive sentences, ambiguous sentences, and sentences failing to meet requirements.

In addition, summary extraction may also be performed on attribute sentences to obtain expert summaries. Graphic-text mining may also be performed to obtain graphic and text contents, information extraction may also be performed to obtain promotion discounts. A detail page may be rewritten to obtain detail page introduction. Comment extraction may be performed to obtain ratings, etc.

Sub-step S2043: Perform standardization processing on attribute contents corresponding to remaining attribute sentences after the cleaning processing, and determine the attribute contents of the attribute sentences and corresponding attribute levels as attribute information of corresponding materials according to the standardization processing result.

Since there are many different methods for describing same attribute and same attribute value, in order to ensure the accuracy of subsequent matching, attribute content may be standardized, and different forms of synonymous expressions may be unified into standard expressions.

For example, "classification", "category", etc. may be standardized as "classification". "Taste", "flavor", etc. are all standardized as "taste". Attribute values and attribute levels may also be standardized in a similar way.

An attribute level is determined based on standardized content corresponding to a "title", and an attribute content is determined based on standardized content corresponding to an "attribute" and an "attribute value". In embodiments, an attribute level of the material is used to indicate a title corresponding to the material, and an attribute content of the material is used to indicate an attribute and an attribute value of a target object described by the material.

In embodiments, the following processing may also be performed for the materials corresponding to the attribute level:

Sub-step S2044: Sort materials with the same attribute value according to first popularity information, and remove repeated materials whose semantic similarity meets a preset value using a longest common subsequence algorithm.

Since multiple materials may be included for the same attribute level, and an attribute value of the same attribute may have one or more expression forms, materials with the same attribute value of the same attribute in the same attribute level may be sorted according to first popularity information.

First popularity information may correspond to different indicators for different application scenarios. If an object is a commodity, first popularity information may be a sales popularity. If an object is the content of a course, first popularity information may be an importance of a knowledge key point or a degree of popularity of a knowledge key point, etc.

In addition, materials may be de-duplicated using a longest common subsequence algorithm, and materials having a relatively high semantic similarity may be de-duplicated, thereby avoiding excessive repetitive semantics and verbose expressions.

Materials with the same attribute in the same attribute level may be sorted according to second degrees of popularity information, and such degree of popularity may be a degree of popularity of selection, etc.

Sub-step S2045: Group remaining materials corresponding to the same attribute content to form an material group after de-duplication according to attribute contents.

For example, materials with the same attribute may form an material group. The material group may include different attribute values of the same attribute.

Sub-step S2046: Combine materials whose attribute content belongs to the same title into an material paragraph.

Because a title corresponds to an attribute level, in order to make a description information file more logical and clearer, material groups belonging to the same attribute level (that is, belonging to the same title) may be formed into an material paragraph to facilitate a subsequent combination of material paragraphs.

Step S206: Select target materials whose attribute content and attribute level match the attribute selection information of the description framework from the materials.

In embodiments, step S206 includes the following sub-steps:

Sub-step S2061: Determine candidate materials that correspond to a corresponding attribute level of each of the titles according to an order of titles indicated by the attribute selection information in the description framework.

Since an attribute level of a material corresponds to a title indicated in the description framework, the attribute level of the material may be matched with the title in the attribute selection information. For example, for a first title "product name" in the description framework, a material whose attribute level is "product name" is selected as a candidate material.

Sub-step S2062: Determine, according to a target attribute corresponding to each title and an attribute value described by the target attribute, target materials whose attribute content matches the target attribute from the candidate materials.

Based on attribute description and attribute selection in the description framework, target attribute corresponding to a title may be determined, and attribute value corresponding to the target attribute may be determined based on attribute value selection and attribute value list in the description framework.

If attribute description corresponding to a title "feature" is "yes", and attribute selection is "any", corresponding target attributes may be obtained by selecting some of "packaging method", "ingredient", "raw ingredients" and "taste" as target attributes, for example, selecting one from each corresponding sub-title, so the target attributes may be "packaging method", "ingredients", and "flavor".

Since the attribute value is listed as "yes" and the attribute value selection is "all", all corresponding attribute values of the target attributes may be listed. Based on this sub-step S2062 is implemented through the following process:

Process A1: Select, according to target attributes corresponding to each title, candidate materials whose attribute content matches the target attributes.

Target attributes such as "Packaging Method", "Ingredients", and "Taste" are taken as an example. According to attribute contents of candidate materials, all attribute contents including "Packaging Method", "Ingredients", and "Taste" are selected as matching candidate materials.

Process A2: Select a candidate material including an attribute value selected by the target attribute from the matched candidate materials as a target material according to the attribute value selected by the target attribute.

Take listing all corresponding attribute values of a target attribute as an example, all matched candidate materials may be used as target materials. Or, if only a portion of attribute values of the target attribute is listed, a candidate material whose attribute content includes the selected attribute value is selected from the matched candidate materials as a target material.

Step S208: Generate a description information file according to the description framework and the target materials.

In embodiments, step S208 may be implemented as: sorting, according to an order of titles indicated by the description framework and attribute levels corresponding to material paragraphs formed by the target materials, the material paragraphs; and generating the description information file according to a sorting result.

Since each material paragraph has a corresponding attribute level, an order of material paragraphs is determined according to a corresponding relationship between the attribute level and a title in the description framework and the order of titles, and the material paragraphs are combined according to the order to form a description information file.

In embodiments, in order to make information description of the description information file more smooth and coherent, attribute selection information of the description framework also includes cohesive sentence information. The cohesive sentence information is used to indicate whether to add a cohesive sentence within a material paragraph or between the material paragraphs. If a value of the cohesive sentence information is "yes", this means that a cohesive sentence is added. Otherwise, if it is "no", no cohesive sentence is added.

In conjunction with FIG. 2B, an example of a generation process of a description information file is given below.

Figure 2B:
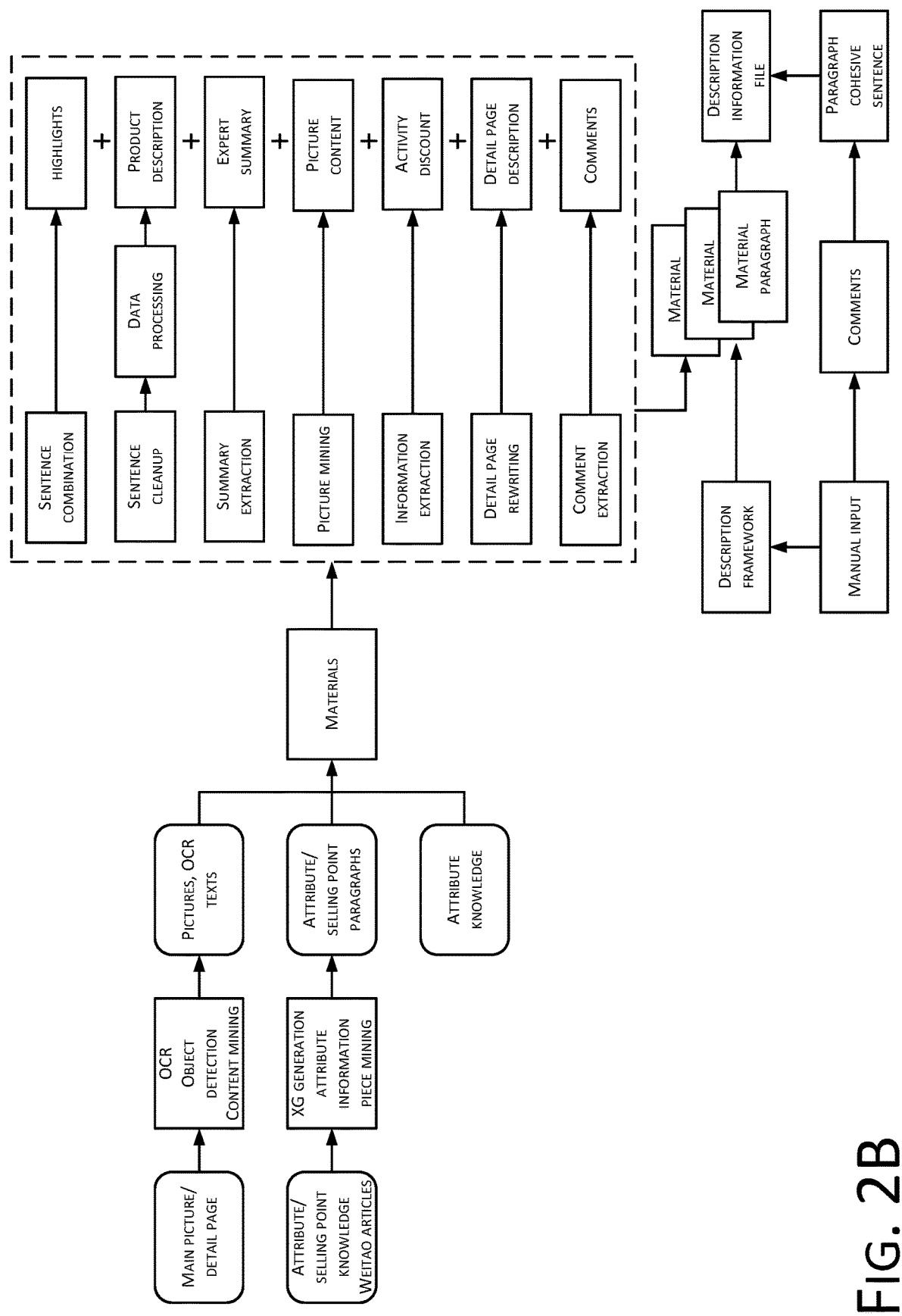
FIG. 2B is a schematic diagram of an example scenario in embodiments as shown in FIG. 2A.

As shown in FIG. 2B, if a target object is a commodity, a picture-type material is obtained from a main picture or a detailed picture of the target object, and a text-type material is obtained from an attribute description, a selling point description, and an explanatory article of the target object.

For picture-type materials, pictures and OCR texts are obtained through OCR recognition, object detection and content mining, etc., and corresponding attribute sentences are then outputted according to the OCR texts.

For text-type materials, corresponding attribute sentences are obtained through attribute mining (such as XG generation, etc.), and combined with existing attribute knowledge to obtain attribute sentences.

For these attribute sentences, for attribute sentences whose attribute level is highlight, a sentence combination may be performed, and semantically redundant sentences may be cleaned up to form materials with the attribute level as the highlight. For attribute sentences whose attribute level is product introduction, sentence cleaning and processing may be performed to form materials with the attribute level as the product introduction. For attribute sentences whose attribute level is an expert summary, a summary extraction may be performed to obtain materials whose attribute level is the expert summary. Similarly, image and text mining, information extraction, detail page rewriting, and comment extraction may also be performed on attribute sentences to obtain corresponding materials. During combination, cohesive sentences may be added between adjacent material paragraphs as needed, to make the description information file to be smoother, less rigid, more in line with expression habits, and more coherent and smooth.

Through the above method, an attribute-based hierarchical description framework and a concatenation technique are used to splice and integrate constructed materials, which may support a semantic dimension integration of multi-source materials, and avoid issues such as irrelevance, redundancy, and coherence, etc. The richness is maintained at a chapter level in the content. The use of multi-mode presentation may effectively enrich the methods of content expression required on a virtual live broadcast. The description framework is reasonably constructed and has good scalability, which may be quickly reused in new categories or industries.

This method may be applied to the field of virtual live broadcasting to quickly generate corresponding live broadcast scripts, and apparently may also be applied to other fields to generate required description information files.

In embodiments, a description framework is used to obtain materials corresponding to different attributes from materials, and the materials are processed according to attribute selection information in the description framework to obtain a description information file. Since the description framework hierarchizes the description information file according to attributes, the description framework is decoupled from the materials, thereby improving the adaptability, and be able to generate corresponding description information files for different target objects and retain features of different target objects to guarantee usage effects.

In embodiments, the data processing method may be executed by any appropriate electronic device with data processing capabilities, which includes, but is not limited to, a server, a mobile terminal (such as a mobile phone, a PAD, etc.), and a PC, etc.

Figure 3:
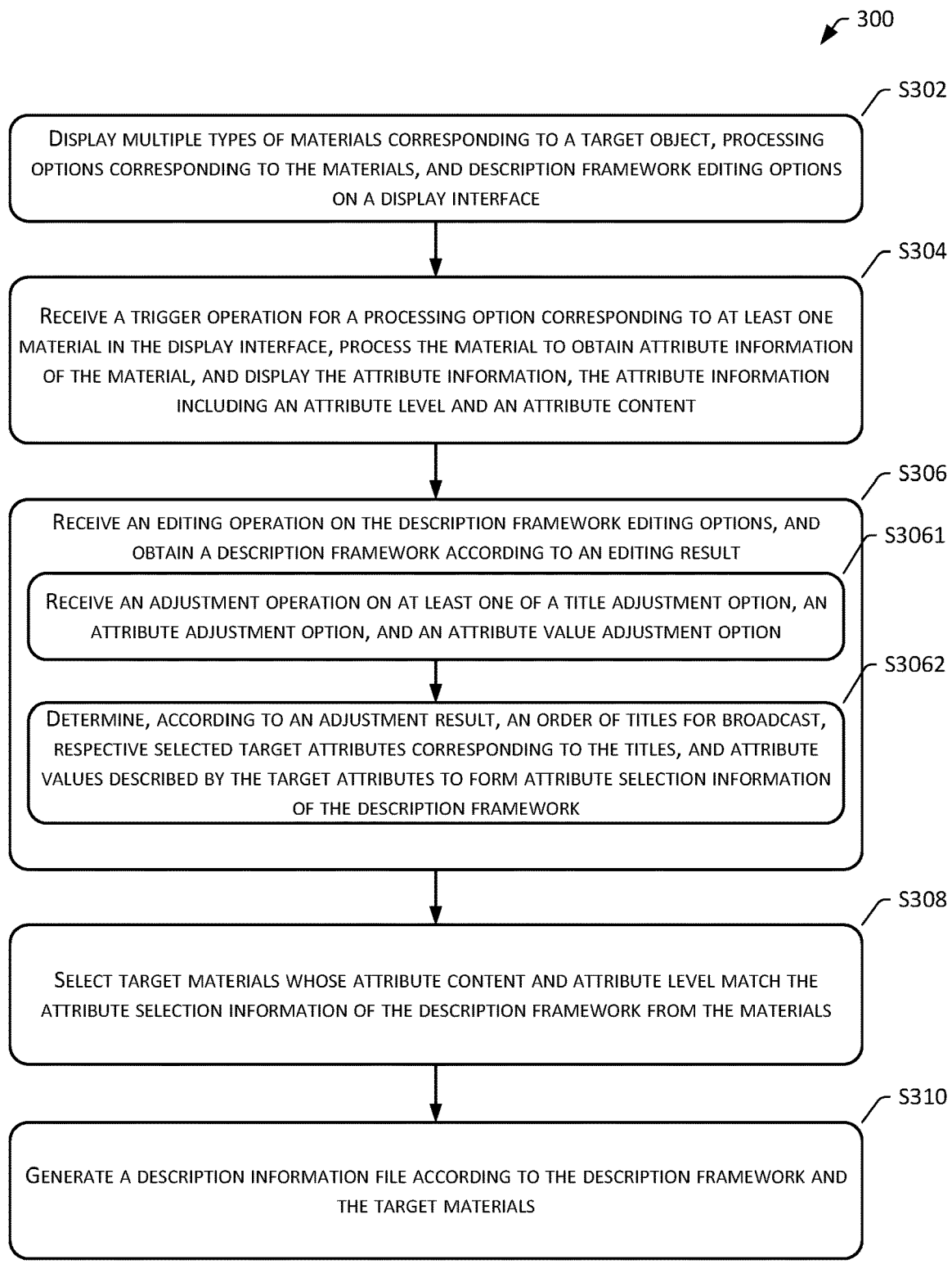
FIG. 3 is a flowchart of a data processing method according to embodiments of the present disclosure.

Referring to FIG. 3, a schematic flowchart of a data processing method 300 of embodiments of the present disclosure is shown.

In embodiments, the method 300 is used to generate a description information file related to a target object, which includes:

Step S302: Display multiple types of materials corresponding to a target object, processing options corresponding to the materials, and description framework editing options on a display interface.

In order to facilitate obtaining a more suitable description framework according to different target objects, and to classify materials more accurately, processing options and description framework editing options corresponding to the materials may be displayed on a display interface.

The processing options are used to select processing to be performed on a material, and attribute information obtained after the processing may also be displayed on the display interface for manual review and/or editing.

The description framework editing options are used to adjust the description framework, such as modifying the content in the description framework.

In embodiments, the description framework editing options include a title adjustment option used to adjust an order of titles in the description framework, an attribute adjustment option used to adjust a selected target attribute corresponding to a title, and an attribute adjustment option used to adjust an attribute value described by a target attribute.

Through the title adjustment option, titles may be added or reduced as needed, or an order of arrangement between titles may be adjusted.

The attribute adjustment option is used to adjust a selected attribute as needed. Similarly, the attribute value adjustment option is used to adjust a selected attribute value as needed.

In embodiments, the description framework editing options may also include a cohesive sentence adjustment option, which is used to adjust whether to add a cohesive sentence as needed.

Step S304: Receive a trigger operation for a processing option corresponding to at least one material in the display interface, process the material to obtain attribute information of the material, and display the attribute information, the attribute information including an attribute level and an attribute content.

For example, by triggering a processing option, corresponding processing may be performed on different types of materials. For example, object detection is performed on an material of a picture type, so as to obtain a corresponding attribute sentence and attribute information corresponding to the attribute sentence, such as an attribute level, an attribute, and an attribute value, etc.

Attribute mining is performed on a text-type material to obtain a corresponding attribute sentence and attribute information corresponding to the attribute sentence, such as an attribute level, an attribute, and an attribute value, etc.

The obtained attribute information may be displayed in the display interface for viewing and editing.

Step S306: Receive an editing operation on the description framework editing options, and obtain a description framework according to an editing result, the description framework including attribute selection information corresponding to the target object.

In the display interface, a corresponding description framework editing option is configured for each title, each attribute selection, etc., and a corresponding value may be changed by editing thereof to obtain a description framework.

In embodiments, step S306 includes the following sub-steps:

Sub-step S3061: Receive an adjustment operation on at least one of a title adjustment option, an attribute adjustment option, and an attribute value adjustment option.

For example, if a new title needs to be added, you a new title may be added in a title row through the title adjustment option.

Additionally and/or alternatively, when all attribute values need to be selected for a certain attribute, an adjusting operation may be performed on a corresponding attribute value adjustment option to adjust a value of an attribute value selection to "ALL".

Sub-step S3062: Determine, according to an adjustment result, an order of titles for broadcast, respective selected target attributes corresponding to the titles, and attribute values described by the target attributes to form attribute selection information of the description framework.

The order of titles may be an order of precedence determined as an order from left to right according to titles displayed in the display interface.

A target attribute may be determined according to values corresponding to two rows of an attribute selection and an attribute description in the display interface.

An attribute value corresponding to a target attribute may be determined according to values corresponding to two rows of an attribute value selection and an attribute value list in the display interface.

Step S308: Select target materials whose attribute content and attribute level match the attribute selection information of the description framework from the materials.

A process of matching according to a description framework and materials is similar to the method embodiments described above, and is not repeatedly described herein.

Step S310: Generate a description information file according to the description framework and the target materials.

A process of generating a description information file is similar to the method embodiments described above, and is not repeatedly described herein.

In embodiments, a description framework and materials may be processed as needed, so as to obtain a more appropriate description framework, to ensure that a description information file so generated has a better usage effect and is able to meet requirements.

In embodiments, the data processing method may be executed by any appropriate electronic device with data processing capabilities, which includes, but is not limited to, a server, a mobile terminal (such as a mobile phone, a PAD, etc.), and a PC, etc.

Figure 4:
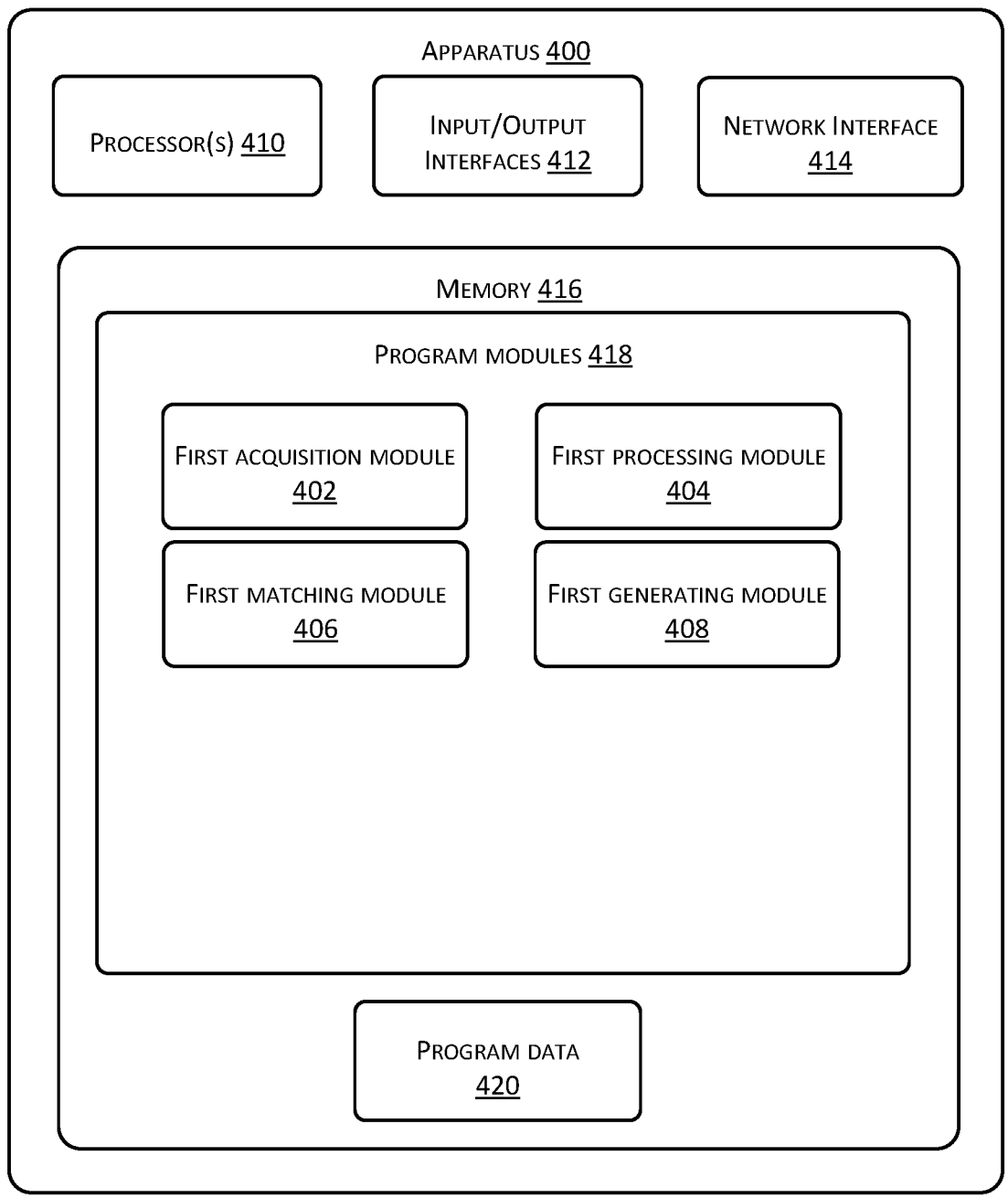
FIG. 4 is a structural block diagram of a data processing apparatus according to embodiments of the present disclosure.

Referring to FIG. 4, a structural block diagram of a data processing apparatus 400 according to embodiments of the present disclosure is shown.

In embodiments, the data processing apparatus 400 is used to generate a description information file related to a target object, which includes:

a first acquisition module 402 configured to obtain a description framework and multiple types of multiple materials related to the target object, the description framework including attribute selection information corresponding to the target object;

a first processing module 404 configured to perform at least one kind of processing on each material to obtain attribute information of the respective material, and the attribute information including an attribute level and an attribute content;

a first matching module 406 configured to select target materials whose attribute content and attribute level match the attribute selection information of the description framework; and a first generating module 408 configured to generate a description information file according to the description framework and the target materials.

In embodiments, the materials of multiple types may include picture-type material and/or text-type material, and the text-type material includes at least one of a text obtained by performing voice recognition on an audio-type material and an original text; and the first processing module 404 is configured to perform graphic recognition on the picture-type material to obtain attribute sentences corresponding to the picture-type material, and/or perform attribute mining on the text-type material to obtain attribute sentences corresponding to the text-type material.

In embodiments, the first processing module 404 is further configured to perform cleaning processing on the attribute sentences according to semantic information of the attribute sentences, standardize attribute contents corresponding to attribute sentences remaining after the cleaning processing, to determine attribute contents of the attribute sentences and corresponding attribute levels as attribute information of corresponding materials based on a standardized processing result.

In embodiments, the attribute selection information of the description framework is used to indicate an order of titles, a selected target attribute corresponding to a title, and a selected attribute value corresponding to the target attribute.

In embodiments, an attribute level of an material is used to indicate a title corresponding to the material, and an attribute content of the material is used to indicate an attribute and an attribute value of the target object described by the material.

In embodiments, the first matching module 406 is configured to determine candidate materials that correspond to an attribute level corresponding to each title according to an order of titles indicated by the attribute selection information in the description framework; and determine, according to a target attribute corresponding to each title and a selected attribute value of the target attribute, target materials whose attribute content matches the target attribute from the candidate materials.

In embodiments, when determining, according to the target attribute corresponding to each title and the selected attribute value of the target attribute, target materials whose attribute content matches the target attribute from the candidate materials, the first matching module 406 is configured to select candidate materials whose attribute content matches the target attribute according to the target attribute corresponding to each title; and select candidate materials that include the attribute value selected by the target attribute from the matched candidate materials as the target materials according to the selected attribute value of the target attribute.

In embodiments, the first processing module 404 is further configured to order materials with a same attribute value according to first popularity information, and remove duplicated materials whose semantic similarity meets a set value through a longest common subsequence algorithm; group remaining materials corresponding to a same attribute content after duplicates are removed into an material group according to attribute contents; and combine materials whose attribute content belongs to a same title into a material paragraph.

In embodiments, the first generating module 408 is configured to order, according to an order of titles indicated by the description framework and attribute levels corresponding to material paragraphs formed by the target materials, the material paragraphs, and generate the description information file according to an ordering result.

In embodiments, the apparatus 400 may further include one or more processors 410, an input/output (I/O) interface 412, a network interface 414, and a memory 416. In embodiments, the memory 416 may include program modules 418 and program data 420. The program modules 418 may include one or more of the foregoing modules as described in FIG. 4.

In embodiments, the memory 416 may include a form of computer readable media such as a volatile memory, a random access memory (RAM) and/or a non-volatile memory, for example, a read-only memory (ROM) or a flash RAM. The memory 416 is an example of a computer readable media.

The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The data processing apparatus in embodiments is used to implement corresponding data processing methods in the foregoing multiple method embodiments, and has the beneficial effects of the corresponding method embodiments, which are not repeatedly described herein. In addition, functional implementations of each module in the data processing apparatus of this embodiment may refer to the description of corresponding parts in the foregoing method embodiments, and details thereof are not repeatedly described herein.

Figure 5:
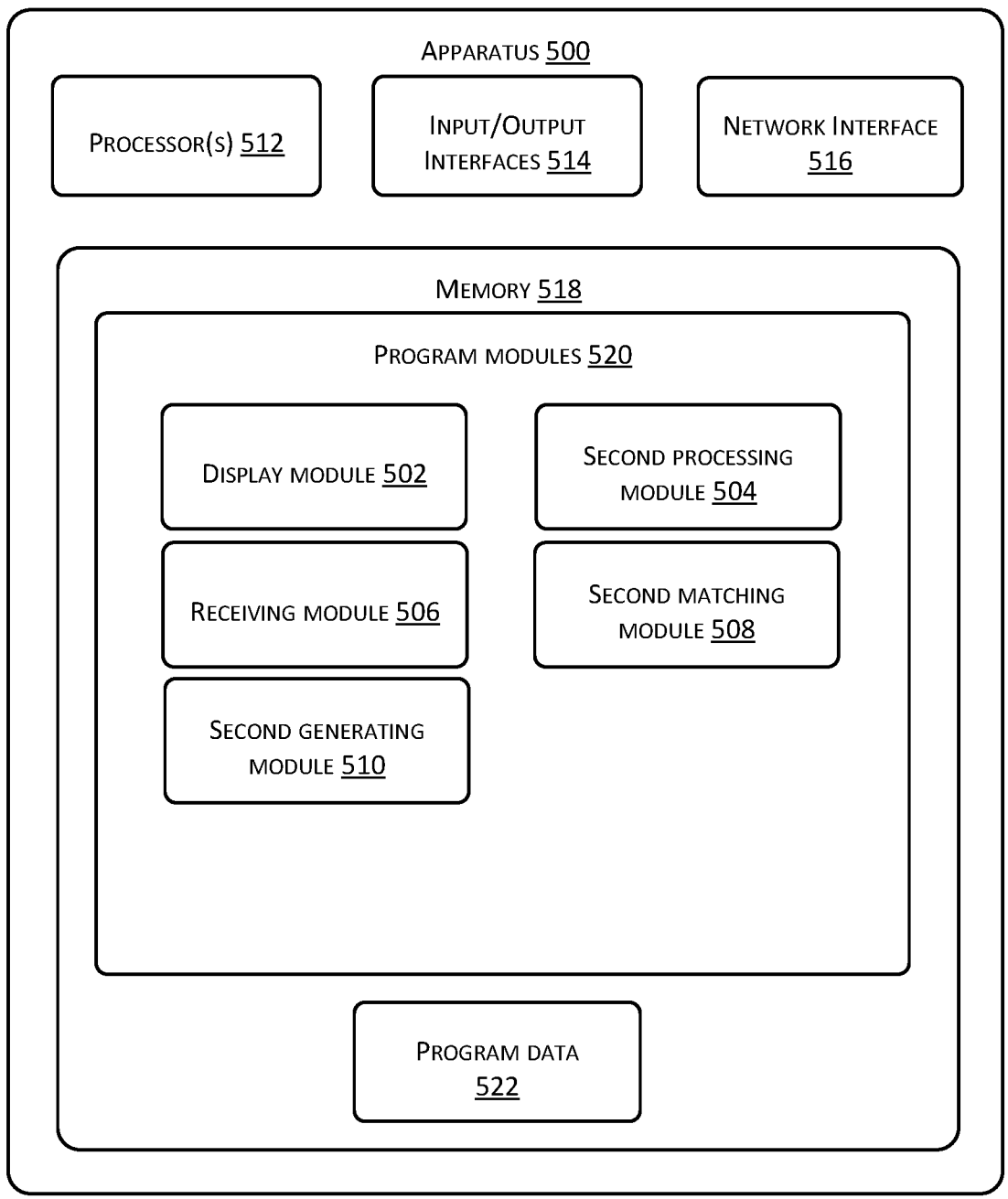
FIG. 5 is a structural block diagram of a data processing apparatus according to embodiments of the present disclosure.

Referring to FIG. 5, a structural block diagram of a data processing apparatus 500 according to embodiments of the present disclosure is shown.

In embodiments, the data processing apparatus 500 is used to generate a description information file related to a target object, which includes:
a display module 502 configured to display multiple types of materials corresponding to the target object, processing options corresponding to the materials and description framework editing options in a display interface;
a second processing module 504 configured to receive a trigger operation for a processing option corresponding to at least one material in the display interface, process the material to obtain attribute information of the material, and display the attribute information, the attribute information including an attribute level and an attribute content;
a receiving module 506 configured to receive an editing operation on the editing option of the description framework, and obtain the description framework according to an editing result, the description framework including attribute selection information corresponding to the target object;
a second matching module 508 configured to select a target material whose attribute content and attribute level match the attribute selection information of the description framework from the materials; and
a second generating module 510 configured to generate a description information file according to the description framework and the target material.

In embodiments, the description framework editing options include a title adjustment option used to adjust an order of titles in the description framework, an attribute adjustment option used to adjust a selected target attribute corresponding to a title, and an attribute adjustment option used to adjust an attribute value described by a target attribute.

In embodiments, the receiving module 506 is configured to receive an adjustment operation on at least one of the title adjustment option, the attribute adjustment option, and the attribute value adjustment option; and determine, according to an adjustment result, an order of titles for broadcast, respective selected target attributes corresponding to the titles, and attribute values described by the target attributes to form attribute selection information of the description framework.

In embodiments, the apparatus 500 may further include one or more processors 512, an input/output (I/O) interface 514, a network interface 516, and a memory 518. In embodiments, the memory 518 may include program modules 520 and program data 522. The program modules 520 may include one or more of the foregoing modules as described in FIG. 5. In embodiments, the memory 518 may include a form of computer readable media as described in the foregoing description.

The data processing apparatus in embodiments is used to implement corresponding data processing methods in the foregoing multiple method embodiments, and has the beneficial effects of the corresponding method embodiments, which are not repeatedly described herein. In addition, functional implementations of each module in the data processing apparatus of this embodiment may refer to the description of corresponding parts in the foregoing method embodiments, and details thereof are not repeatedly described herein.

Figure 6:
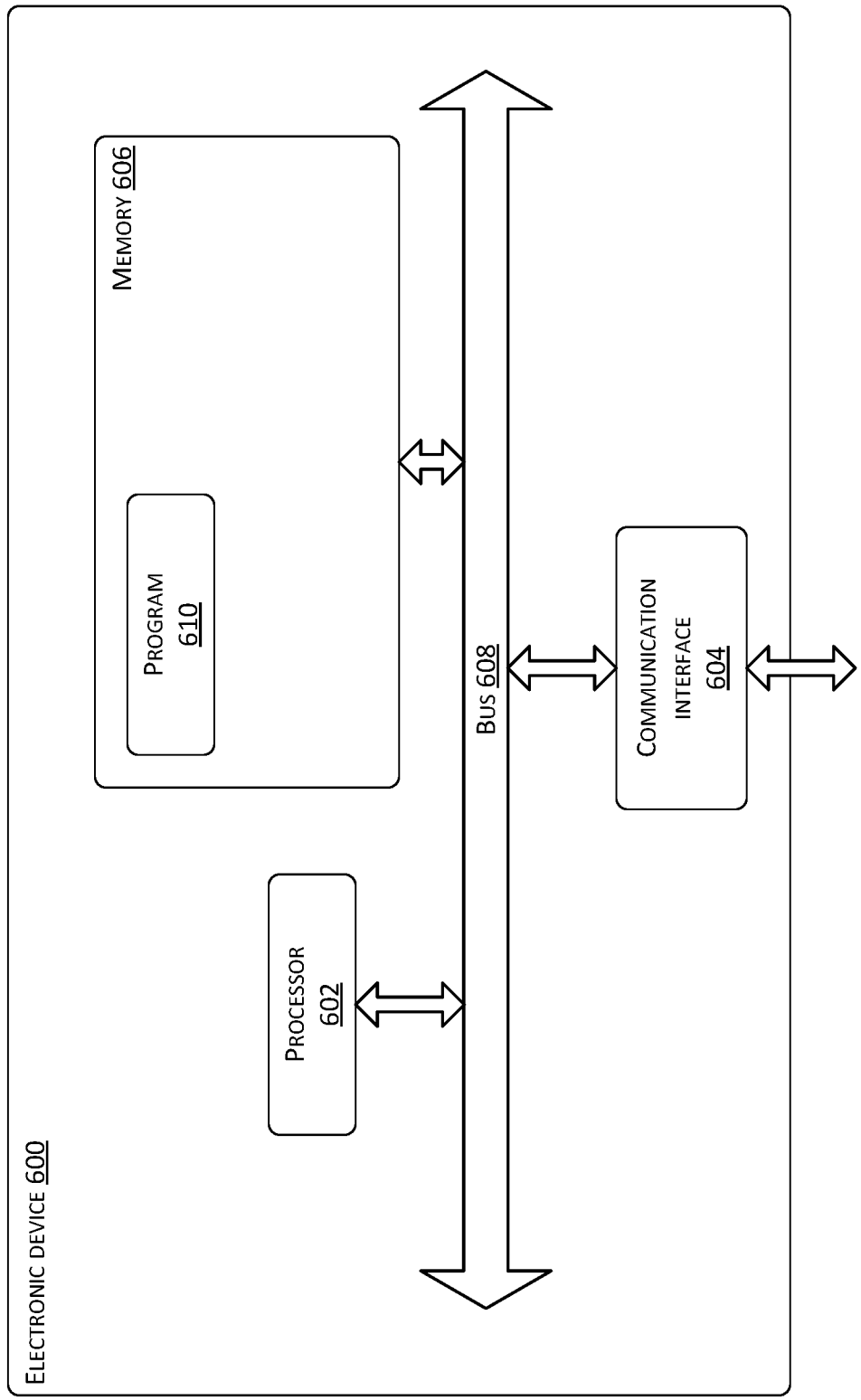
FIG. 6 is a schematic structural diagram of an electronic device according to embodiments of the present disclosure.

Referring to FIG. 6, a schematic structural diagram of an electronic device 600 according to a sixth embodiment of the present disclosure is shown. The specific embodiment of the present disclosure does not limit specific implementations of the electronic device.

As shown in FIG. 6, the electronic device may include: a processor 602, a communication interface 604, a memory 606, and a communication bus 608, wherein:
the processor 602, the communication interface 604, and the memory 606 communicate with each other through the communication bus 608.

The communication interface 604 is used to communicate with other electronic devices or servers.

The processor 602 is configured to execute a program 610, and may specifically execute relevant steps in the foregoing data processing method embodiments.

Specifically, the program 610 may include program codes, and the program codes include computer operation instructions.

The processor 602 may be a central processing unit (CPU), or a specific integrated circuit ASIC (Application Specific Integrated Circuit), or one or more integrated circuits configured to implement embodiments of the present disclosure. The one or more processors included in the electronic device may be a same type of processor, such as one or more CPUs, or different types of processors, such as one or more CPUs and one or more ASICs.

The memory 606 is used to store the program 610. The memory 606 may include a high-speed RAM memory, and may also include a non-volatile memory (non-volatile memory), for example, at least one magnetic storage device.

The program 610 may be specifically used to cause the processor 602 to perform operations corresponding to the aforementioned data processing methods.

Specific implementations of each step in the program 610 may be referenced to corresponding descriptions of corresponding steps and units in the foregoing data processing method embodiments, and details thereof are not repeated herein. One skilled in the art may clearly understand that, for convenience and conciseness of description, specific working processes of devices and modules described above may refer to corresponding process descriptions in the foregoing method embodiments, which are not repeated herein.

It should be pointed out that, according to the needs of implementations, each component/step described in embodiments of the present disclosure may be split into more components/steps, or two or more components/steps or partial operations of components/steps may be combined into new components/steps to achieve the purpose of embodiments of the present disclosure.

The above methods according to embodiments of the present disclosure can be implemented in hardware, firmware, or implemented as software or computer code that can be stored in a recording medium (such as CD ROM, RAM, a floppy disk, a hard disk, or a magnetic disk or an optical disk), or implemented as a computer code that is originally stored in a remote recording medium or a non-transitory machine-readable medium, downloaded through a network, and stored in a local recording medium. As such, the methods described herein can be processed by such software that is stored in a recording medium and uses a general-purpose computer, a dedicated processor, or a programmable or dedicated hardware (such as ASIC or FPGA). It can be understood that a computer, a processor, a microprocessor controller, or programmable hardware includes a storage component (for example, RAM, ROM, flash memory, etc.) that can store or receive a software or computer code. When the software or computer code is accessed and executed by a computer, a processor or hardware, the virtual machine hot migration method(s) described herein is/are implemented. In addition, when a general-purpose computer accesses code(s) for implementing the virtual machine hot migration method(s) shown herein, an execution of the code(s) converts the general-purpose computer into a special computer for executing the virtual machine hot migration method(s) shown herein.

One of ordinary skill in the art may be aware that the units and method steps of the examples described in combination with embodiments disclosed herein can be implemented by electronic hardware or a combination of computer software and electronic hardware. Whether these functions are executed by hardware or software depends on specific applications and design constraint requirements of the technical solutions. One skilled in the art can use different methods for each specific application to implement the described functions, but such implementation should not be considered as going beyond the scope of embodiments of the present disclosure.

The above implementations are only used to illustrate embodiments of the present disclosure, and are not intended to limit embodiments of the present disclosure. One of ordinary skill in the relevant technical field can also make various modifications and changes without departing from the spirit and scope of embodiments of the present disclosure. Therefore, all equivalent technical solutions also belong to the scope of embodiments of the present disclosure, and the scope of patent protection of embodiments of the present disclosure needs to be defined by the claims.

What is claimed is:

1. A method implemented by a computing device, the method comprising:
    obtaining a description framework and multiple types of multiple materials related to a target object, the description framework including attribute selection information corresponding to the target object;
    performing at least one kind of processing on each material to obtain attribute information of a respective material, the attribute information including an attribute level and an attribute content;
    selecting target materials whose attribute content and attribute level match the attribute selection information of the description framework; and
    generating a description information file according to the description framework and the target materials.

2. The method according to claim 1, wherein:
    the multiple types of multiple material comprise a picture-type material and/or a text-type material, and the text-type material comprises at least one of a text obtained by performing voice recognition on an audio-type material and an original text; and
    performing at least one type of processing on each material to obtain the attribute information of the respective material comprises:
        performing graphic-text recognition on the picture-type material to obtain attribute sentences corresponding to the picture-type material, and/or
        performing attribute mining on the text-type material to obtain attribute sentences corresponding to the text-type material.

3. The method according to claim 2, wherein performing the at least one kind of processing on each material to obtain the attribute information of the respective material further comprises:
    performing cleaning processing on the attribute sentences according to semantic information of the attribute sentences; and
    standardizing attribute contents corresponding to remaining attribute sentences obtained after the cleaning processing, to determine attribute contents of the attribute sentences and corresponding attribute levels as attribute information of corresponding materials based on a standardized processing result.

4. The method according to claim 1, wherein the attribute selection information of the description framework is used to indicate an order of titles, a selected target attribute corresponding to a title, and a selected attribute value corresponding to the selected target attribute.

5. The method according to claim 4, wherein the attribute level of the respective material is used to indicate a title corresponding to the respective material, and the attribute content of the respective material is used to indicate an attribute and an attribute value of the target object described by the respective material.

6. The method according to claim 4, wherein selecting the target materials whose attribute content and attribute level match the attribute selection information of the description framework comprises:
   determining candidate materials that correspond to an attribute level corresponding to each title according to an order of titles indicated by the attribute selection information in the description framework; and
   determining, according to a target attribute corresponding to each title and a selected attribute value of the target attribute, target materials whose attribute content matches the target attribute from the candidate materials.

7. The method according to claim 6, wherein determining, according to the target attribute corresponding to each title and the selected attribute value of the target attribute, target materials whose attribute content matches the target attribute from the candidate materials comprises:
   selecting candidate materials whose attribute content matches the target attribute according to the target attribute corresponding to each title; and
   selecting candidate materials that include the selected attribute value selected by the target attribute from the matched candidate materials as the target materials according to the selected attribute value of the target attribute.

8. The method according to claim 4, wherein generating the description information file according to the description framework and the target materials comprises:
   ordering, according to an order of titles indicated by the description framework and attribute levels corresponding to material paragraphs formed by the target materials, the material paragraphs, and generate the description information file according to an ordering result.

9. The method according to claim 1, wherein performing the at least one kind of processing on each material to obtain attribute information of the respective material further comprises:
   ordering materials with a same attribute value according to first popularity information, and remove duplicated materials whose semantic similarity meets a set value through a longest common subsequence algorithm;
   grouping remaining materials corresponding to a same attribute content after duplicates are removed into an material group according to attribute contents; and
   combining materials whose attribute content belongs to a same title into an material paragraph.

10. An apparatus comprising:
   one or more processors; and
   memory storing executable instructions that, when executed by the one or more processors, cause the one or more processors to perform operations comprising:
      displaying multiple types of materials corresponding to a target object, processing options corresponding to the multiple type of materials and description framework editing options in a display interface;
      receiving a trigger operation for a processing option corresponding to at least one material in the display interface, process the at least one material to obtain attribute information of the at least one material, and displaying the attribute information, the attribute information including an attribute level and an attribute content;
      receiving an editing operation on a description framework editing option, and obtaining a description framework according to an editing result, the description framework including attribute selection information corresponding to the target object;
      selecting a target material whose attribute content and attribute level match the attribute selection information of the description framework from the multiple type of materials; and
      generating a description information file according to the description framework and the target material.

11. The apparatus according to claim 10, wherein the description framework editing options comprise a title adjustment option used to adjust an order of titles in the description framework, an attribute adjustment option used to adjust a selected target attribute corresponding to a title, and an attribute adjustment option used to adjust an attribute value described by a target attribute.

12. The apparatus according to claim 11, wherein receiving the editing operation on the description framework editing option, and obtaining the description framework according to the editing result, comprises:
   receiving an adjustment operation on at least one of the title adjustment option, the attribute adjustment option, and the attribute value adjustment option; and
   determining, according to an adjustment result, an order of titles for broadcast, respective selected target attributes corresponding to the titles, and attribute values described by the target attributes to form attribute selection information of the description framework.

13. One or more computer readable media storing executable instructions that, when executed by one or more processors, cause the one or more processors to perform acts comprising:
   obtaining a description framework and multiple types of multiple materials related to a target object, the description framework including attribute selection information corresponding to the target object;
   performing at least one type of processing on each material to obtain attribute information of a respective material, the attribute information including an attribute level and an attribute content;
   selecting target materials whose attribute content and attribute level match the attribute selection information of the description framework; and
   generating a description information file according to the description framework and the target materials.

14. The one or more computer readable media according to claim 13, wherein:
   the multiple types of materials comprise a picture-type material and/or a text-type material, and the text-type material comprises at least one of a text obtained by performing voice recognition on an audio-type material and an original text; and
   performing the at least one type of processing on each material to obtain the attribute information of the respective material comprises:
   performing graphic recognition on the picture-type material to obtain attribute sentences corresponding to the picture-type material, and/or
   performing attribute mining on the text-type material to obtain attribute sentences corresponding to the text-type material.

15. The one or more computer readable media according to claim 14, wherein performing the at least one processing on each material to obtain the attribute information of the respective material further comprises:
- performing cleaning processing on the attribute sentences according to semantic information of the attribute sentences; and
- standardizing attribute contents corresponding to remaining attribute sentences obtained after the cleaning processing, to determine attribute contents of the attribute sentences and corresponding attribute levels as attribute information of corresponding materials based on a standardized processing result.

16. The one or more computer readable media according to claim 13, wherein the attribute selection information of the description framework is used to indicate an order of titles, a selected target attribute corresponding to a title, and a selected attribute value corresponding to the target attribute.

17. The one or more computer readable media according to claim 16, wherein the attribute level of the respective material is used to indicate a title corresponding to the respective material, and the attribute content of the respective material is used to indicate an attribute and an attribute value of the target object described by the respective material.

18. The one or more computer readable media according to claim 16, wherein selecting the target materials whose attribute content and attribute level match the attribute selection information of the description framework comprises:
- determining candidate materials that correspond to an attribute level corresponding to each title according to an order of titles indicated by the attribute selection information in the description framework; and
- determining, according to a target attribute corresponding to each title and a selected attribute value of the target attribute, target materials whose attribute content matches the target attribute from the candidate materials.

19. The one or more computer readable media according to claim 18, wherein determining, according to the target attribute corresponding to each title and the selected attribute value of the target attribute, target materials whose attribute content matches the target attribute from the candidate materials comprises:
- selecting candidate materials whose attribute content matches the target attribute according to the target attribute corresponding to each title; and
- selecting candidate materials that include the attribute value selected by the target attribute from the matched candidate materials as the target materials according to the selected attribute value of the target attribute.

20. The one or more computer readable media according to claim 16, wherein generating the description information file according to the description framework and the target materials comprises:
- ordering, according to an order of titles indicated by the description framework and attribute levels corresponding to material paragraphs formed by the target materials, the material paragraphs, and generate the description information file according to an ordering result.

* * * * *